United States Patent Office 3,655,710
Patented Apr. 11, 1972

3,655,710
PROCESS FOR THE PREPARATION OF ARYLDIMETHYLCHLOROSILANES
Andre Bazouin, Luzinay, and Marcel Lefort, Caluire, France, assignors to Rhone-Poulenc S.A., Paris, France
No Drawing. Filed Mar. 11, 1970, Ser. No. 18,770
Claims priority, application France, Mar. 13, 1969, 6907120
Int. Cl. C07f 7/02
U.S. Cl. 260—448.2 P
8 Claims

ABSTRACT OF THE DISCLOSURE

Aryldimethylchlorosilanes are prepared in good yield when a diaryldichlorosilane and trimethylchlorosilane are heated together in the liquid phase in the presence of aluminum chloride as a catalyst.

---

The present invention provides a process for the preparation of aryldimethylchlorosilanes by redistribution between a diaryldichlorosilane and trimethylchlorosilane.

Rathousky et al. [Coll. Czech. Chem. Comm. 25, 1807 (1960)] have described a process for the preparation of phenyldimethylchlorosilane which consists in heating a mixture of diphenyldichlorosilane and trimethylchlorosilane in the vapour phase at 500°, in the presence of a catalyst consisting of the complex formed by aluminum chloride and sodium chloride. This process has the disadvantage of being carried out at very high temperatures and giving low yields of phenyldimethylchlorosilane. Consequently such a process is of little interest on an industrial scale.

According to the present invention there is provided a process for the preparation of aryldimethylchlorosilanes which comprises heating a diaryldichlorosilane with trimethylchlorosilane in the liquid phase at 70° C. to 220° C., preferably at 100° C. to 180° C., in the presence of aluminum chloride as catalyst.

The process of the present invention may be represented by the following general reaction scheme:

$$Ar_2SiCl_2 + 2(CH_3)_3SiCl \rightarrow 2Ar(CH_3)_2SiCl + (CH_3)_2SiCl_2$$

in which the symbol Ar represents an aryl radical, especially phenyl, which may be unsubstituted or substituted by chlorine.

Where the boiling point of the mixture is lower than the reaction temperature, the process may be carried out under autogenous pressure; where the mixture is markedly volatile at the reaction temperature, it may be kept in the liquid phase by introducing an inert gas such as nitrogen or carbon dioxide under pressure.

It is preferable to use such amounts of reagents that the molar ratio of trimethylchlorosilane to the diaryldichlorosilane is at least 2:1 and especially between 3:1 and 6:1.

The aluminum chloride may be used in proportions by weight of 0.1 to 10% and preferably of 1 to 3% relative to the total weight of the chlorosilane mixture employed. Aluminum chloride stored in the form of coarse blocks and finely ground just before use is preferably employed.

At the end of the period of heating, the duration of which may vary from 1 to 30 hours depending on the reaction temperature used, the constituents may be separated by a known method, for example by fractional distillation. To avoid aluminum chloride being carried over in the distillates with the concomitant occurrence of undesirable side-reactions, it is advisable to complex the catalyst in the final mixture without altering the amount of the other constituents comprising this mixture. This operation may be carried out at ambient temperatures (for example 20° to 25° C.) (a) by adding a ketone, such as acetone; or (b) by briefly heating the final mixture under reaction temperature and pressure conditions readily ascertained by a person skilled in the art, after adding an alkali metal halide, such as sodium chloride, as complexing agent. The aryldimethylchlorosilane may then be isolated by, for example, fractional distillation.

The aryldimethylchlorosilanes obtained are very widely used in the organosilicon derivatives industry, in particular for the preparation of organopolysiloxane resins to which the aromatic radicals confer better resistance to heat stresses and greater thermoplasticity. The present process, in addition to providing good yields of aryldimethylchlorosilanes, also yields dimethyldichlorosilane, which is the starting material for the preparation of dimethylpolysiloxane fluids and elastomers.

The following examples illustrate the invention.

EXAMPLE 1

2718 g. (25 mols) of trimethylchlorosilane, 1266 g. (5 mols) of diphenyldichlorosilane and 80 g. of aluminum chloride powder were introduced into a 5 litre stainless steel autoclave equipped with a rotating stirrer.

The mixture was heated at 150° C. for 7 hours. The maximum pressure reached was 8.25 kg./cm.$^2$. After cooling, 120 g. of sodium chloride were added to the mixture, the autoclave resealed, and the mixture was again heated at 150° C. for 1 hour 30 minutes.

After cooling, 741 g. of dimethyldichlorosilane and 1847 g. of trimethylchlorosilane were isolated by distillation, and 1193 g. of a fraction (B.P./22 mm. Hg: 89°–90.8° C.) containing 91% by weight of phenyldimethylchlorosilane were obtained.

The liquid by-products recovered (362 g.) essentially consisted of phenylmethyldichlorosilane, diphenyldimethylsilane and diphenylmethylchlorosilane.

The yield of phenyldimethylchlorosilane was 64% relative to the diphenyldichlorosilane consumed and 80% relative to the trimethylchlorosilane consumed.

EXAMPLE 2

21,740 g. of trimethylchlorosilane 10,130 g. of diphenyldichlorosilane and 640 g. of aluminum chloride were heated for 7 hours at 135° C. in a 50 litre autoclave.

After cooling, 350 g. of acetone were added to the mixture while stirring.

On distillation, 4090 g. of dimethyldichlorosilane were isolated and 14,893 g. of trimethylchlorosilane were recovered. Thereafter, 10,325 g. of a fraction containing 90% by weight of phenyldimethylchlorosilane were obtained. The yields (defined in Example 1) were 68% and 87%, respectively.

EXAMPLE 3

The experiment described in Example 1 was repeated, but starting with 2283 g. (21 mols) of trimethylchlorosilane 1773 g. (7 mols) of diphenyldichlorosilane and 82 g. of aluminum chloride, the mixture being heated at 150° C. for 4 hours.

After cooling, the aluminum chloride was complexed as described in Example 1.

Three further experiments were carried out under identical conditions and all the reaction mixtures thus obtained were then combined.

2430 g. of dimethyldichlorosilane were, in total, isolated by distillation and 4685 g. of trimethylchlorosilane were recovered. 5755 g. of a fraction containing 85% by weight of phenyldimethylchlorosilane were obtained. The yields (defined in Example 1) were 52% and 70%, respectively.

EXAMPLE 4

210 g. of di(p-chlorophenyl)dichlorosilane 355 g. of trimethylchlorosilane and 11.5 g. of aluminum chloride were heated to 150° C. for 7 hours in a 1 litre autoclave.

After cooling, the catalyst was complexed by adding 6 g. of acetone.

Finally, on distillation, 58 g. of dimethyldichlorosilane were isolated and 253 g. of trimethylchlorosilane were recovered. Thereafter 210 g. of a fraction containing 87% of p-chlorophenyldimethylchlorosilane were obtained.

The yields relative to the di(p-chlorophenyl)dichlorosilane and to the trimethylchlorosilane were 73% and 97%, respectively.

We claim:

1. A process for the preparation of aryldimethylchlorosilanes which comprises heating a diaryldichlorosilane with trimethylchlorosilane in the liquid phase at 70° C. to 220° C. in the presence of aluminum chloride as catalyst.

2. The process according to claim 1, in which the diarylchlorosilane is diphenyldichlorosilane or a di(chlorophenyl)dichlorosilane.

3. The process according to claim 1, in which the reaction temperature is from 100° to 180° C.

4. The process according to claim 1 in which the molar ratio of trimethylchlorosilane to diaryldichlorosilane is at least 2:1.

5. The process according to claim 4 in which the molar ratio of trimethylchlorosilane to diaryldichlorosilane is from 3:1 to 6:1.

6. The process according to claim 1 in which 1% to 3% by weight of the total chlorosilane mixture of aluminum chloride is employed.

7. The process according to claim 1 in which the catalyst in the reacted mixture is complexed without altering the amount of the other constituents comprising this mixture.

8. A process according to claim 7 in which the complexing agent for the catalyst is sodium chloride or acetone.

References Cited

UNITED STATES PATENTS

| | | | |
|---|---|---|---|
| 2,730,540 | 1/1956 | Sauer | 260—448.2 P |
| 2,887,500 | 5/1959 | McEntee | 260—448.2 P |
| 3,135,778 | 6/1964 | Sleddon | 260—448.2 P |
| 3,398,171 | 8/1968 | Giraitis | 260—448.2 P |

OTHER REFERENCES

Rathousky et al., Collection of Czech Chem. Comm., Vol. 25, (1960), pps. 1807–1813, OD1 C69.

TOBIAS E. LEVOW, Primary Examiner

W. F. W. BELLAMY, Assistant Examiner